United States Patent
McKinney

(10) Patent No.: US 6,932,411 B2
(45) Date of Patent: *Aug. 23, 2005

(54) GARMENT FOR OCCUPANTS OF PERSONAL RECREATION VEHICLES

(75) Inventor: Scott McKinney, P.O. Box 5608, Twin Falls, ID (US) 83303

(73) Assignees: Scott McKinney, Jerome, ID (US); Forrest L. Lebaron, Twin Falls, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/758,246

(22) Filed: Jan. 13, 2004

(65) Prior Publication Data

US 2004/0217619 A1 Nov. 4, 2004

Related U.S. Application Data

(63) Continuation-in-part of application No. 10/336,361, filed on Jan. 2, 2003, now Pat. No. 6,676,188.

(51) Int. Cl.$^7$ .................................................. B60J 7/20
(52) U.S. Cl. ............................ 296/81; 296/136.01; 2/84
(58) Field of Search ............................ 296/81, 136.01, 296/78.1; 150/166, 167; 2/93, 69, 84

(56) References Cited

U.S. PATENT DOCUMENTS

| | | | |
|---|---|---|---|
| 1,802,807 A | 4/1931 | Davis | 296/81 |
| 2,093,834 A | 9/1937 | Gaugler | 128/145 |
| 2,255,751 A | 9/1941 | Bancel | 128/144 |
| 2,657,396 A | 11/1953 | Klein et al. | 4/160 |
| 4,146,933 A | 4/1979 | Jenkins et al. | 2/2 |
| 5,052,738 A | 10/1991 | Li | 296/78.1 |
| 5,429,534 A | 7/1995 | Cano | 440/88 |
| 5,662,372 A | 9/1997 | Lubkeman | 296/136 |
| 5,777,296 A | 7/1998 | Bell | 219/211 |
| 6,073,998 A | 6/2000 | Siarkowski et al. | 297/180.12 |
| 6,264,084 B1 | 7/2001 | Hayes | 224/408 |
| 6,341,378 B1 | 1/2002 | Pietsch et al. | 2/87 |

Primary Examiner—Joseph D. Pape
(74) Attorney, Agent, or Firm—Pedersen & Co., PLLC; Ken J. Pedersen; Barbara S. Pedersen

(57) ABSTRACT

A garment that attaches to the body of a personal recreational vehicle, preferably covers substantially all of the wearer's body, and traps heat generated and lost by the vehicle engine. The garment is preferably large enough to allow the wearer to sit or stand and turn as necessary without restraint. It may also equipped with a zipper in front that allows the wearer to vent heated air or to exit the garment and vehicle without detaching the garment from the vehicle. In the preferred embodiment, the garment is removably attached to a storage container attached to the vehicle behind the driver/wearer. The bottom hem of the garment is attached or anchored to the body of the vehicle in order to better trap heat and to keep the garment in place. The apparatus for attaching the garment to the vehicle preferably is strong enough to remain attached despite high winds and/or high vehicle velocity.

20 Claims, 4 Drawing Sheets

GARMENT FOR OCCUPANTS OF PERSONAL RECREATION VEHICLES

This application is a continuation-in-part of, and claims priority from U.S. patent application Ser. No. 10/336,361, filed Jan. 2, 2003, entitled Garment for Occupants of Personal Recreation Vehicles, issued as U.S. Pat. No. 6,676,188, the disclosure of which is incorporated herein by this reference.

BACKGROUND OF THE INVENTION

1. Field of the Invention

This invention relates to clothing and more particularly to clothing worn by the users of recreational vehicles, such as all-terrain vehicles (ATV's) and snowmobiles, in order to stay warm and dry.

2. Related Art

A variety of clothing items are marketed to the users of recreational equipment designed to keep the wearer warm and dry. The majority are lined with some type of insulation in order to trap the wearer's body heat. Others contain some type of heating element. For example, Bell (U.S. Pat. No. 5,777,296), issued Jul. 7, 1998, discloses a battery-powered thermal garment containing electronic heating elements.

Jenkins, et al. (U.S. Pat. No. 4,146,933), issued Apr. 3, 1979, discloses a garment that may be heated or cooled. It must be attached to a pressurized source of hot or cold air. The air is allowed to circulate throughout the space between the garment and the wearer.

Cano (U.S. Pat. No. 5,429,534), issued Jul. 4, 1995, discloses a heated garment for use in conjunction with a personal watercraft. Water heated by passage through the propulsion system is diverted and passed through tubing in the lining of the garment, then ejected out the back of the suit.

SUMMARY OF THE INVENTION

An object of the present invention is to create a garment that heats the wearer while operating a personal recreation vehicle, such as an ATV or snowmobile, by capturing the heat from the vehicle's motor. It is also an objective of the invention to protect the wearer from precipitation and water splashed by the vehicle and to act as a windbreaker.

The invention comprises a garment for drivers or passengers of personal recreational vehicles, such as an ATV or snowmobile. The garment captures heat naturally produced by the vehicle's engine which would otherwise be lost through convection to the atmosphere. The garment traps, in the space between the garment and wearer, the air warmed by proximity to the engine and the associated warm equipment, which, in turn warms the wearer. Also, the garment's insulating properties reduce heat loss from the user's body and from the trapped air. Hunters will find the invention especially useful because of the cold and snowy or rainy conditions they encounter, in addition to the need to frequently travel long distances. The bottom hem of the garment is usually attached, or held close, to the frame, fenders, or other surfaces of the vehicle in order to better trap heat and to keep the garment in place. The means for attaching the garment to the vehicle preferably is strong enough to remain attached despite high winds and/or high vehicle velocity.

DETAILED DESCRIPTION OF THE INVENTION

Referring to the figures, there is shown one, but not the only, embodiment of the invented garment system for use with an ATV.

Figure 1:
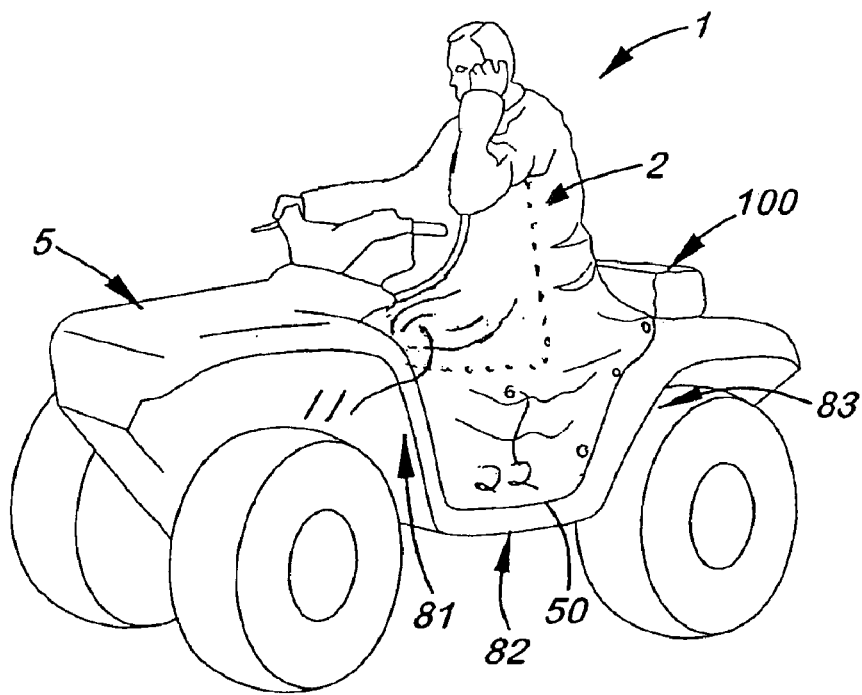
FIG. 1 is a perspective view of the preferred embodiment of the invention taken from the user's left side with the user seated on an ATV.
Figure 2:
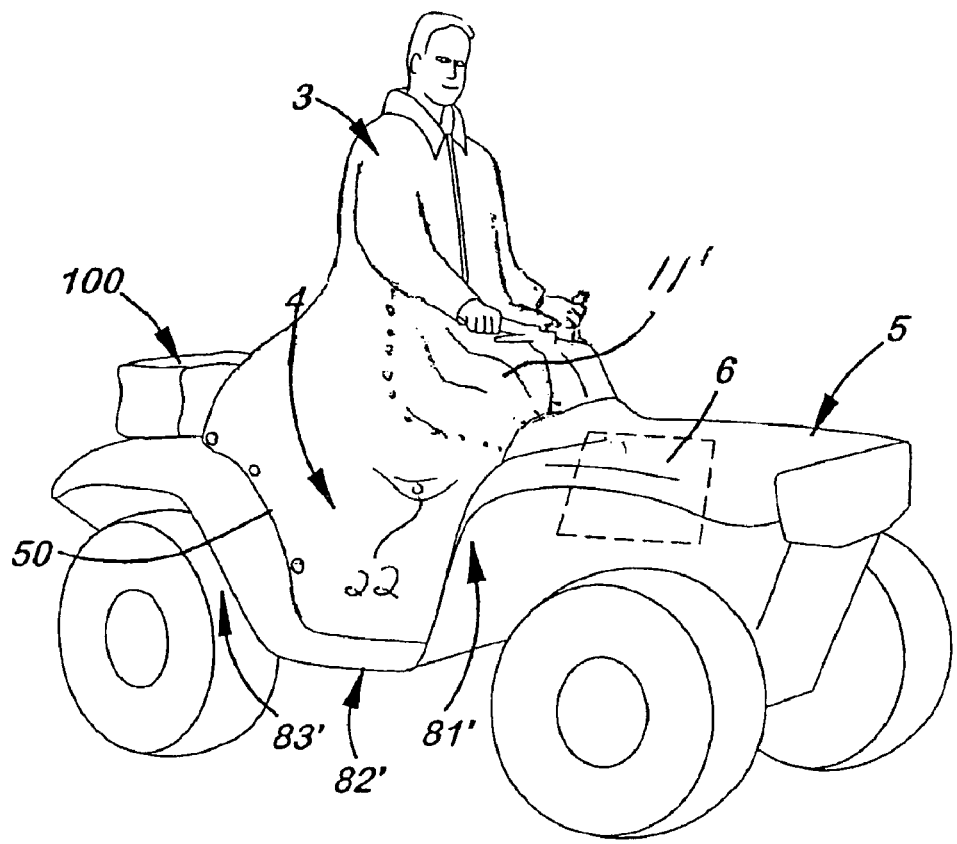
FIG. 2 is a perspective view of the preferred embodiment of the invention taken from the user's right side with the user standing on an ATV.

As shown in FIGS. 1 and 2, the preferred garment system 1 comprises a sleeved garment 2 that attaches to a personal recreational vehicle 5. The garment 2 is of sufficient length that the wearer may comfortably stand or sit while the garment is in use attached to a personal recreation vehicle 5. The garment 2, comprising top portion 3 and bottom portion 4, preferably, but not necessarily covers substantially the entire body of the wearer, but is open at the bottom and is adapted to allow the user's head and hands to protrude for operation. However, when combined with a personal recreation vehicle 5, the garment forms a soft shell that almost completely encloses the otherwise open driver/occupant compartment or "driver seating area." While the inventor prefers a garment that covers the user's body up over his/her shoulders and that covers the user's arms, the inventor also envisions embodiments that are sleeveless or short sleeved, or that only extend up to the user's waste, for example.

The garment 2 flares out at the bottom toward bottom perimeter edge 50, to an extent that: 1) allows the bottom perimeter edge 50 to reach and attach to the vehicle 5 surface surrounding and defining the occupant compartment, 2) creates adequate space for the wearer to stand and turn his body, and 3) creates an interior space between the garment and the user large enough to allow warm air to reach the user's upper body. The garment 2, on most personal recreation vehicles 5, is not connected to any exhaust or fluid conduits from the engine 6 and is not heated by any pressurized source of hot air or liquid. Instead, the air trapped by the garment 2 is warmed by convection and radiation, by heat from the structure in front of and below the driver, including the internal combustion engine 6.

As shown in FIGS. 1, 2, 3, and 4, the bottom hem 50 of the garment 2 is usually attached to the frame (including the frame, fenders or other body panels, or other vehicle body surfaces) of the vehicle 5 in order to better trap heat and to keep the garment in place. The most preferred embodiment attaches to an ATV with a system of hard-snaps 51, 51', 52, 52', 53, 53', 54, 54', 55, 55', 56, 56', 73, and 73' because the system for attaching the garment to the vehicle 5 preferably is strong enough to remain attached despite high winds and/or high vehicle velocity. Conversely, the attachment system is preferably capable of being detached quickly at need. The snaps are attached to the body of the vehicle 5 with screws (not shown). Other systems, such as zippers, hook-and-loop or Velcro® strips, hooks, hooks and eyelets, clamps, clips, ties, other snaps, or other fasteners may be used. Preferably, the fasteners are strong enough to remain attached despite wind and high vehicle velocity, but can be unfastened/released by the wearer for convenience or when exiting the vehicle. The fasteners may be at spaced intervals along the perimeter of the hem, as in the preferred embodiment, or may be substantially continuous along the hem, preferably to anchor, connect, and attach the garment to the vehicle. Preferably, the garment is not held on the vehicle merely by a "friction fit" wherein the garment would be draped down over the vehicle but not anchored by fasteners, as this would not withstand the winds and high vehicle velocity envisioned by the inventor.

Figure 3:
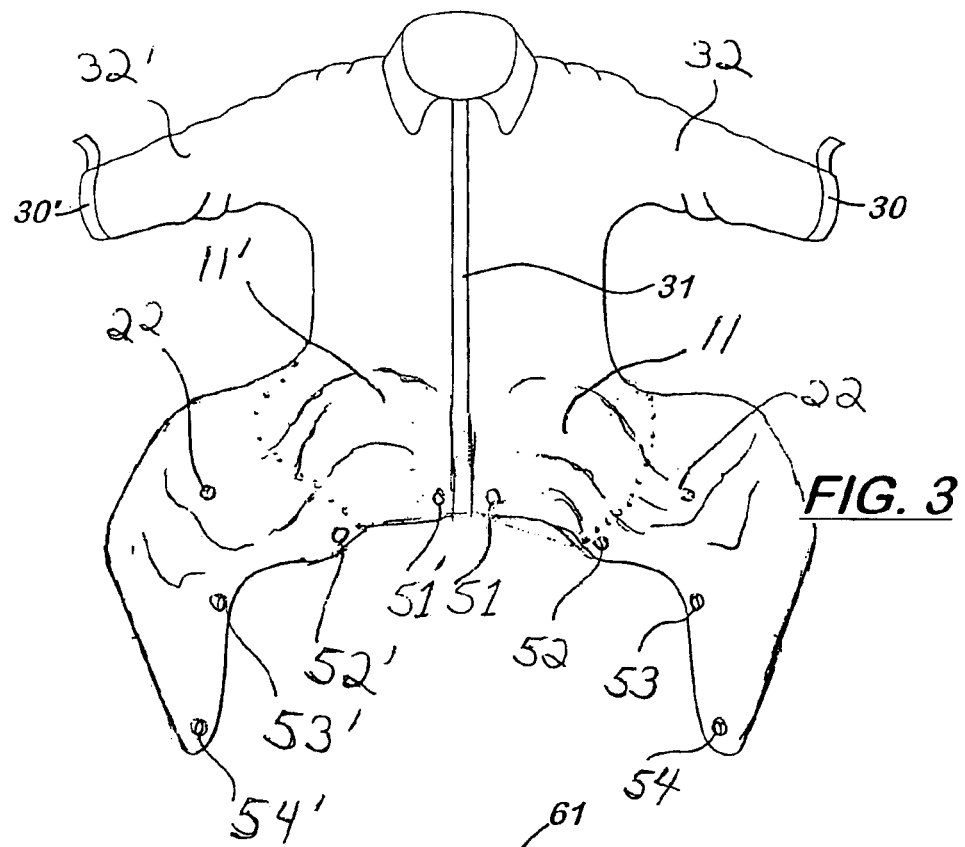
FIG. 3 is a front view of the preferred embodiment of the garment, positioned as if attached to an ATV with a wearer seated with arms outspread.
Figure 4:
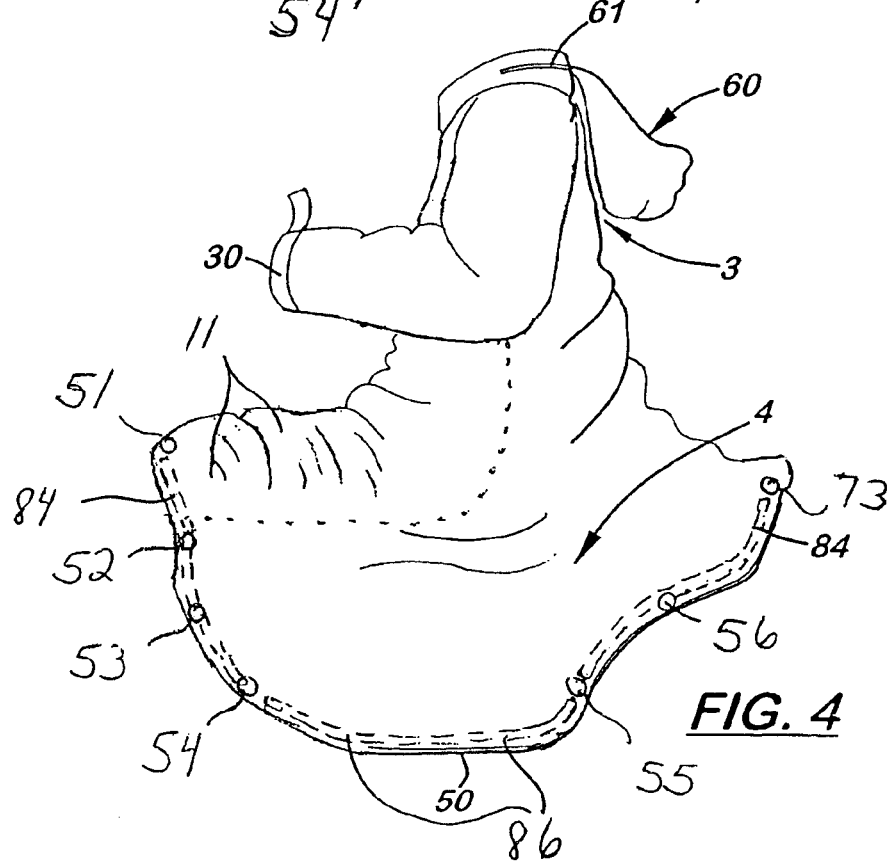
FIG. 4 is a left side view of the preferred embodiment of the garment, positioned as if attached to an ATV with a wearer seated with arms forward.
Figure 5:
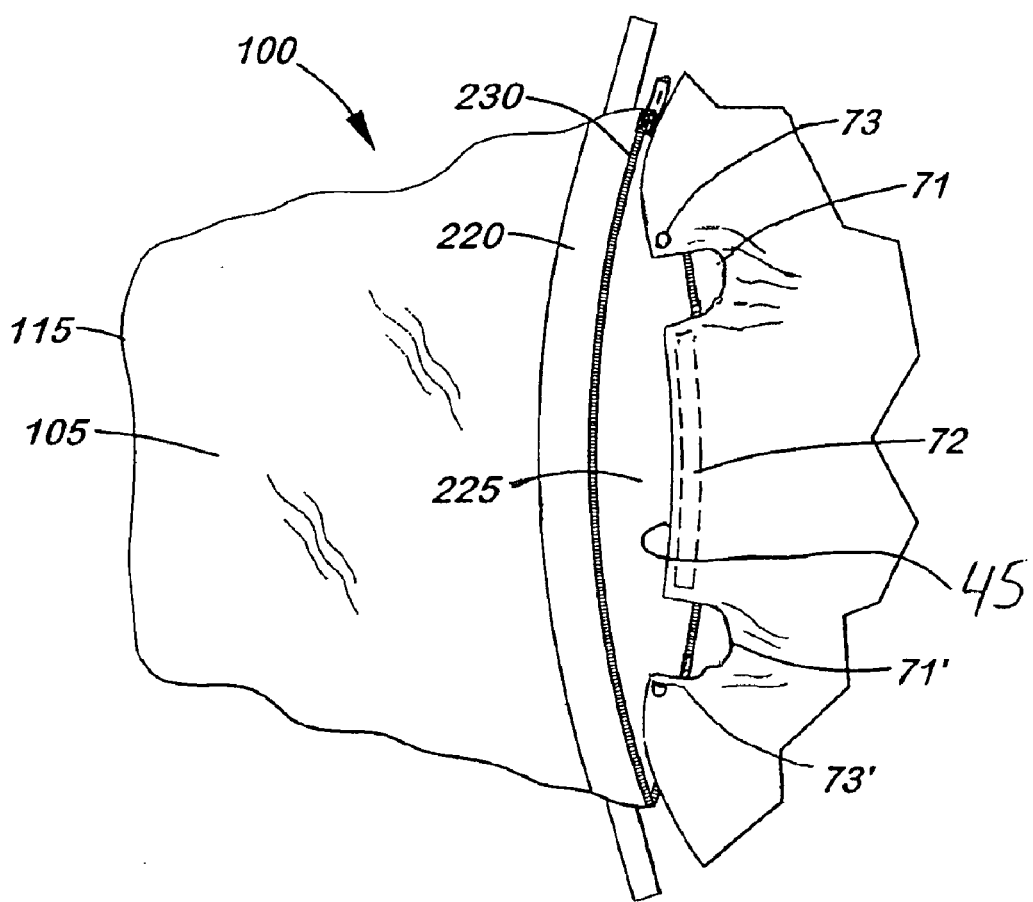
FIG. 5 is a view of the edge of the garment attached to one embodiment of a storage container.

As shown in FIG. 3, the front of the preferred embodiment includes an opening 31 down the front middle. This allows the user to partially open the garment 2 to vent excess heat, to remove the garment 2, or to exit the vehicle 5. The opening can be closed with any known fasteners, for example, a standard zipper. Other possibilities include snaps and hook-and-loop or Velcro® strips. As shown in FIGS. 3 and 4, the ends of the sleeves 32, 32' are equipped with adjustable cuffs 30 and 30' that may be tightened so as to prevent heat loss and loosened for removal.

As shown in FIG. 4, the preferred embodiment is equipped with an attached hood 60. In the preferred embodiment, the hood is sewn into the collar in its own compartment closed by zipper 61, but may be attached by other means such as sewing, snaps, or a hook-and-loop or Velcro® system.

As shown in FIGS. 1, 2, 5 and 7, the rear-most portion 45 of the garment's edge is preferably connected to a storage container 100, which is positioned on the rear of the ATV where an ATV bag or a passenger's seat pad would be placed. The rear-most portion 45 is preferably attached to the inside edge of a storage container 100 by two snaps 73 and 73' at the corners and a hook-and-loop or Velcro® strip connection 72 in between. Preferably, the connection 72 does not extend to the snaps 73 and 73', leaving one or more spaces 71 and 71' to allow venting. Further, these spaces 71, 71' may be formed by means of two roughly semi-circular spaces 71 and 71' cut in the garment in this region to facilitate venting. Spaces 71, 71' may provide venting of air trapped in the garment and may facilitate circulation of warm around the user. For example, especially during travel at significant speeds, if some air flows from outside of the garment into the interior space between the garment and the user, these spaces 71, 71' may vent this air to prevent "ballooning" of the garment. Optionally, spaces 71, 71' may be reduced in size or eliminated, with any desired venting being provided by the garment's front opening 31, or by the small gaps between the garment and the vehicle surfaces between the various snaps attaching the garment to the vehicle.

Figure 6:
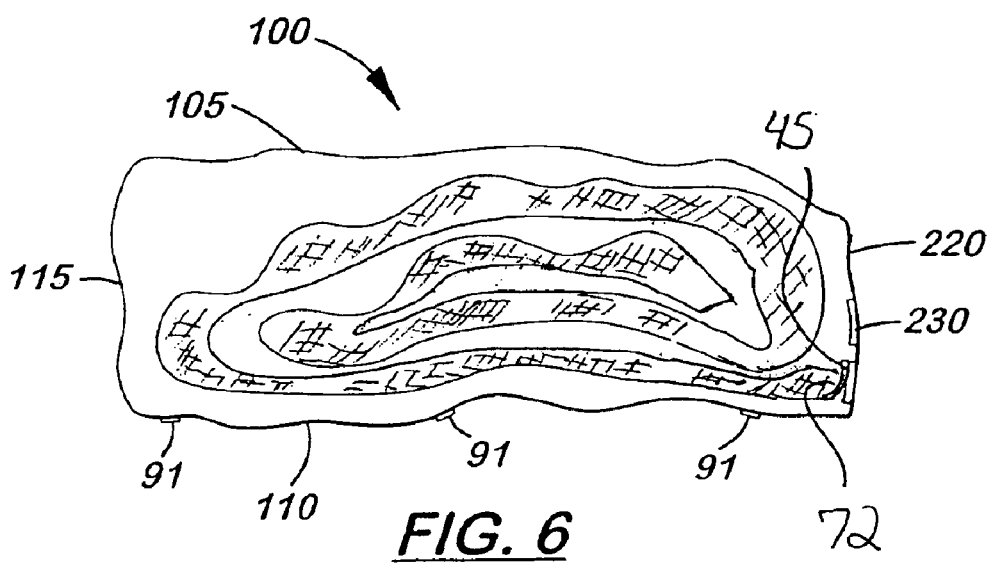
FIG. 6 is a right side view of the storage container of FIG. 5 with the crumpled-up garment stored therein, according to one embodiment of the invention.

As schematically illustrated in FIG. 6, the garment 2 may be removed from the wearer and vehicle 5 and sealed in the storage bag 100 without careful or compact folding. The garment 2 need not be disconnected along the back hook-and-loop or Velcro® strip connection 72 or at the snaps 73, 73, as the connection 72 and the snaps 73, 73' are preferably on an inside surface of the bag 100, and the bag will close around the entire garment, including the connection 72 and snaps 73, 73'. Thus, the garment may stay attached to the bag 100 during use and during storage. The container is fixedly attached to the vehicle 5 by a system of connectors 91. It is closed with a zipper 230 or other closing system. While the bag 100 may be sized to only hold the garment 2, it may also be sized to contain other objects and/or have other compartments besides the garment compartment. This way, the bag 100 may become a general purpose storage and supply bag for the user.

Figure 7:
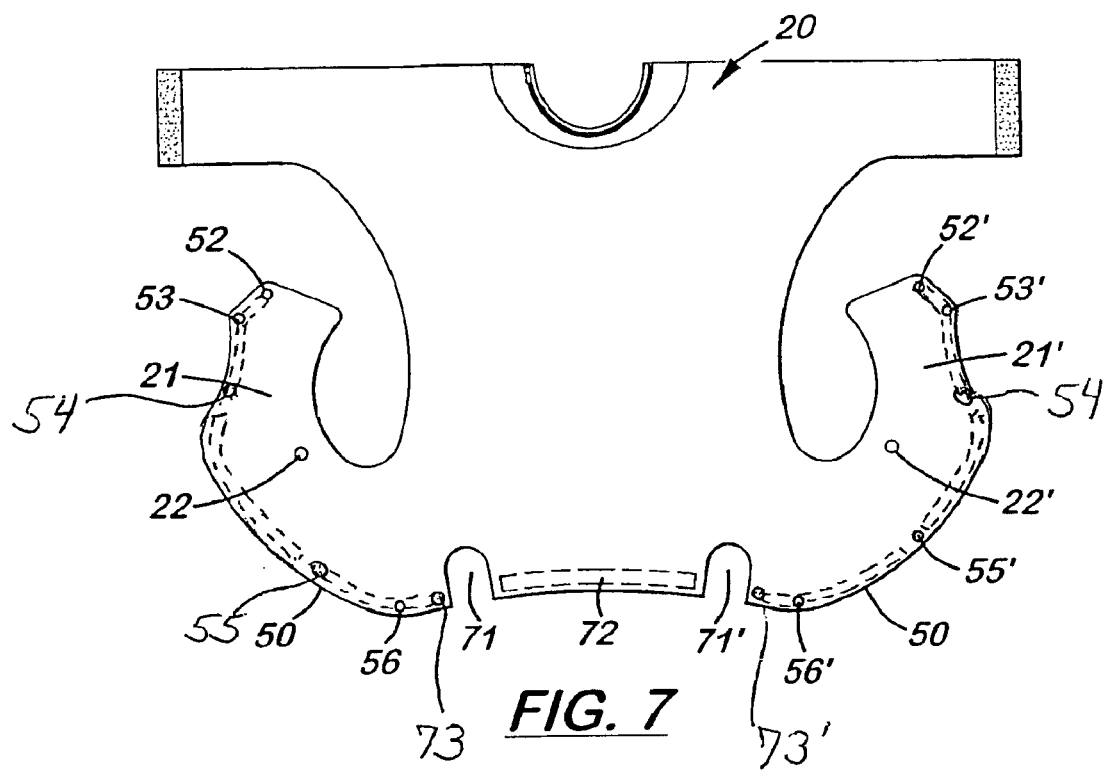
FIG. 7 is a rear view of the back panel of the preferred embodiment of the garment prior to sewing.

The garment uses an excess of fabric in order to allow the wearer to both sit and stand comfortably. As illustrated in FIG. 1, when the user is seated, there are some small folds of fabric around the user's waste or legs. As illustrated in FIG. 2, this excess fabric allows even a tall person to stand comfortably. The garment is preferably at least six feet long measured from the neck line to the lowest point of the bottom hem, for allowing a tall person to stand up in the garment when using it on a recreational vehicle. When the driver is seated, the shape of the garment 2 is such that the weight of water may push the fabric down on either side of the user, creating concave trough areas on the sides below the wearer's thighs. These troughs can fill with water. To prevent this problem, one or more reinforced drainage holes 22 and 22' are located on either side flap, as shown in FIGS. 1, 2, and 7, to allow drainage of any water that may collect in these troughs at the bottom portion 4 of the garment while the wearer is seated in wet conditions. Water drains through these holes 22, 22', onto the vehicle 5 floorboards 82 and 82', and then onto the ground.

Figure 8:
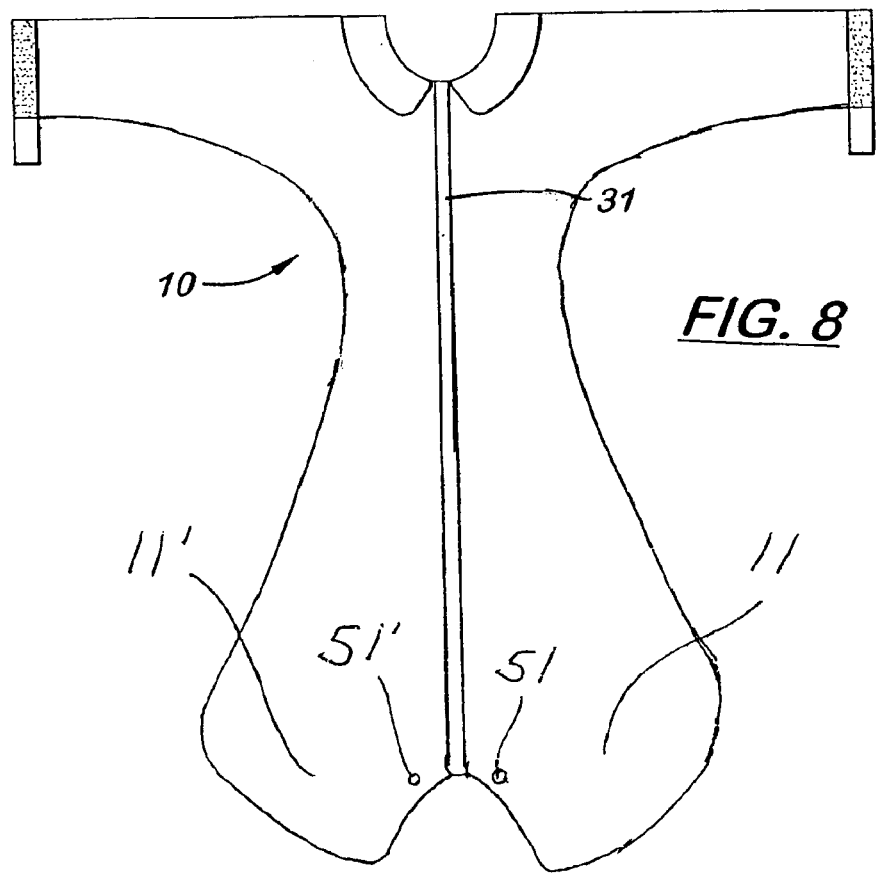
FIG. 8 is a frontal view of the front panel of the preferred embodiment of the garment prior to sewing.

As shown in FIGS. 7 and 8, the preferred embodiment of the garment 2 is made from two flat panels 10 and 20 of fabric. A garment of this size and complexity would be expected to require several panels of material, rather than only two, so that manufacture of the preferred embodiment of the garment 2 is surprisingly cost-effective and convenient. As shown in FIG. 8, the front panel 10 gradually widens from top to bottom, and includes long panel portions (11, 11'). These panel portions (11, 11'), when sewn to the rear panel and attached to the vehicle, form gussets 11 and 11' over the wearer's thighs and knees that are extra material that bulges over the use's knees to improve comfort and ease of movement while driving.

The garment may be made from two panels of fabric for efficiency of fabric use and cutting and sewing. However, the invented garment may also be made from alternative numbers and shapes of fabric panels and/or other materials, as will be apparent to a designer or seamstress after viewing this Description and the Drawings.

As illustrated in FIG. 7, the back panel 20 has two flaps 21 and 21' that, when sewn to the front panel 10, extend down and forward on either side of the wearer, from the rear of the driver's compartment, down to the floorboards, and forward to the front fenders and the gas tank. The outer edge of the flaps 21, 21' forms most of the bottom hem 50 that connects to the vehicle 5. The flaps 21 and 21' are attached to the bottom of the gussets 11 and 11' to form a substantial portion of the bottom portion 4 that connects to the vehicle 5 via snaps 52, 52', 53, 53', 54, 54', 55, 55', 56, and 56' and 73, 73'.

FIGS. 1–4 illustrate, by the use of dotted lines below the user's arms, the seams between the front panel 10 and the back panel 20. Also shown in FIGS. 1–4 is the preferred extra material (gussets 11, 11') that assists in a roomy and comfortable fit for the typical wearer.

In the preferred embodiment, the garment 2 is made from multi-layered or insulated, water-resistant material. The body of the garment 2 is preferably constructed from Nylon with PVC backing, a material known commercially as Texas Cloth® because it is flexible, but sufficiently stiff to not flap when in use in windy conditions or at high speed. The collar and hood 60 are preferably constructed from Storm-Tech® or Gortex® material. The hood 60 zips into the collar, and both can be tightened together.

The bottom edge of the garment 2 is preferably lined with bungee material 84 and 84' or other elastic means, except along floorboard 82 and 82'. The bungee material 84, 84' makes the lower portion 4 easier to install on a personal recreation vehicle 5 because the placement of snaps (51–56, 73) on the personal recreation vehicle 5 need not be perfectly aligned to an exact spacing of snaps on the garment 2. The garment's bottom hem may be sized slightly larger than the perimeter of vehicle surface that the hem attaches to, with the bungee material allowing the hem to stretch and to retract appropriately to snap to the vehicle snaps without loose hem fabric flapping in the wind.

Preferably, snaps 54 and 55, and 54' and 55' are placed part way up on the fenders of the vehicle, so that they are easily reached by the user. Further, there is preferably no bungee material between snaps 54 and 55, and 54' and 55', but there is a semi-rigid or resilient plastic cable 86 or other reinforcing cable or strip in/attached to the hem to retain the shape of the hem in that area and to urge the hem down against the floorboards. The preferred cable 86 is a rubber rope that is somewhat stretchable along its longitudinal axis, and that may be flexed so that it takes the shape of the hem. The preferred rubber rope, by virtue of its weight and resiliency, tends to maintain the hem in the desired shape that substantially matches the contour of the vehicle surface in the area of the floorboards, and tends to keep the hem down against the floorboards without flapping. The bungee material 84 and 84' and the resilient cable 86 limit the entry of outside air under the bottom hem 50 of the garment 2 by keeping the bottom edge snug against the personal recreation vehicle 5. Alternatively, other weights may be applied or inserted into the garment, preferably at or near the bottom perimeter edge, for holding the garment edge down and, in cooperation with the fasteners, to prevent the garment from flying up and/or off the vehicle.

In the preferred embodiment, there are two sets of seven snaps that attach the garment to the vehicle. Snaps 51, 51' are on the front panel 10 on or near the gas tank of the ATV. Snaps 52, 52', 53, 53', 54, 54', 55, 55', 56, 56' and 73, 73' are on each side of the back panel 20, in mirror image of each other. Thus, there are snaps on or near the gas tank of the ATV, snaps on each front fender 81 and 81' (preferably at least one each near the top and bottom of the fenders), snaps on each rear fender 83 and 83' (preferably at least one each near the top and bottom of the fenders), and snaps (73, 73') at the rear of the vehicle.

The preferred embodiment comes with a storage container 100 that is attached to the recreational vehicle 5 immediately behind the driver's position so that the garment 2 may be quickly and easily removed and stored or taken out and put to use. The storage container 100 is placed such that it does not interfere with the use of rear carrying racks, and can be used as a seat cushion by a passenger. Storage container 100 is preferably sewn to have a top panel 105 and a bottom panel 110 separated by an edge panel 115 substantially all the way around the container. This spacing of the top and bottom panels 105 and 110 gives ample room for stuffing the garment 2 into the container 100. Preferably, the container is generally triangular, with a front side 220 having opening 225 and a zipper or closing apparatus 230, for retaining the garment 2 inside the closed container 100.

In the preferred embodiment, the garment 2 is manufactured from material that is water-proof or water-resistant to protect the user and resistant to heat transfer in order to adequately preserve heat. The garment 2 may have an optional cape or shoulder flap (not shown) that may assist in water-proofing the shoulder seams, for example.

The preferred embodiment of the invention attaches directly to the pre-existing vehicle surfaces, such as the original equipment manufacture (OEM) fenders, gas tank, floorboards, or other body panels partially surrounding or otherwise generally adjacent to the driver and/or passenger compartment. However, the inventor also envisions that the garment may be attached to an intermediate structure provided on the fenders, gas tank, floorboards and/or other body panels. For example, a molded extension, ring, or wall could be permanently attached to the fenders, gas tank, and/or floorboards that would extend part of the way upwards from the vehicle to the user, and the garment could attach to that extension, ring, or wall. Thus, the term "attached to vehicle surfaces" includes embodiments in which the garment attaches directly to the OEM vehicle surfaces, or in which the garment is attached indirectly to the OEM vehicle by being attached to a retrofitted, added structure that extends up from the OEM surfaces. After viewing this Description and the Drawings, one may understand how the invented apparatus may be used in cooperation with various recreational vehicles, including an ATV and a snowmobile, for example. While the contour and size of the frame, body panels, and other body surfaces of a snowmobile are different than an ATV, a snowmobile still vehicle body surfaces partially surrounding and/or adjacent to the snowmobile's driver compartment to which the garment may be releasably attached.

Although this invention has been described above with reference to particular means, materials, and embodiments, it is to be understood that the invention is not limited to these disclosed particulars, but extends instead to all equivalents within the scope of the following claims.

I claim:

1. A garment system for a recreational vehicle having an occupant's compartment that is open to the atmosphere and vehicle body surfaces partially surrounding the occupant's compartment, the garment system comprising a garment having a main body comprising a top portion worn by a user of the vehicle and a bottom portion having a perimeter edge extending down to contact at least some of said vehicle body surfaces; and a plurality of fasteners adapted to fasten the bottom portion perimeter edge to said vehicle body surfaces so that wind does not lift the garment off of the vehicle and so that heat naturally escaping from the internal combustion motor of the personal recreational vehicle into the occupant's compartment is held in the occupant's compartment between the vehicle and the garment, and is used to heat the vehicle's occupants.

2. A garment system according to claim 1 wherein the garment comprises arms with arm holes through which the occupant can drive the vehicle.

3. A garment system according to claim 1 wherein the garment is made from water-resistant or water-proof material.

4. A garment system according to claim 1 wherein said fasteners for fastening the garment bottom portion perimeter edge to the personal recreation vehicle are selected from the group consisting of snap-type attachments, zippers, hook-and-loop strips, hooks, hooks and eyelets, clamps, clips, ties, and combinations thereof.

5. A garment system according to claim 1 wherein the garment is equipped with a system in a front portion of the main body that allows the wearer to remove the garment without separating it from the vehicle.

6. A garment system according to claim 5 wherein said system for removing the garment is selected from the group consisting of a multiplicity of snap-type attachments, hook-and-loop strips, zippers, and combinations thereof.

7. A garment system according to claim 1 having a front portion with right and left leg gussets that bulge up in the front to provide extra room for the occupant's legs while seated.

8. A garment system according to claim 1, wherein said garment is at least six feet long measured from the neck line to the lowest point of the bottom hem.

9. A garment system according to claim 1, with one or more openings in the garment to allow venting of excess heat.

10. A garment system according to claim 9, wherein said one or more openings are in a rear portion of the garment.

11. A garment system according to claim 1, wherein said bottom portion perimeter edge comprises a weight for keeping the perimeter edge down against the vehicle.

12. A garment system according to claim 11, wherein said weight comprises a resilient cable.

13. A garment system according to claim 12, wherein said resilient cable is a rubber cable.

14. A garment system for a recreational vehicle having an occupant's compartment that is open to the atmosphere and vehicle body surfaces partially surrounding the occupant's compartment, the garment system comprising a garment having a main body comprising a top portion worn by a user of the vehicle and a bottom portion having a perimeter edge extending down to contact at least some of said vehicle body surfaces; and a plurality of fasteners adapted to fasten at least a portion of the bottom portion perimeter edge to said vehicle body surfaces; and a storage container near the bottom portion perimeter edge and a connection system adapted to connect the storage container to the vehicle so that said garment can be easily and quickly stored in the storage container or removed from the storage container for use.

15. A garment system according to claim 14, wherein the garment is detachable from the storage container.

16. A garment system according to claim 14, wherein the garment is connected to the storage container on an inside surface of the storage container so that the garment is rollable or stuffable into the storage container without the garment being disconnect from the storage container.

17. A garment system according to claim 14 wherein the said container is located immediately behind the vehicle driver's position and connected to the bottom portion perimeter edge.

18. A garment system according to claim 14, wherein said bottom portion perimeter edge comprises a weight for keeping the perimeter edge down against the vehicle.

19. A garment system according to claim 18, wherein said weight comprises a resilient cable.

20. A garment system according to claim 19, wherein said resilient cable is a rubber cable.

* * * * *